US012370712B1

(12) United States Patent
Liu

(10) Patent No.: US 12,370,712 B1
(45) Date of Patent: Jul. 29, 2025

(54) PAPER CUTTER AND DOUBLE BLADE PAPER CUTTER

(71) Applicant: Yong Liu, Zhejiang (CN)

(72) Inventor: Yong Liu, Zhejiang (CN)

( * ) Notice: Subject to any disclaimer, the term of this patent is extended or adjusted under 35 U.S.C. 154(b) by 0 days.

(21) Appl. No.: 18/963,667

(22) Filed: Nov. 28, 2024

Related U.S. Application Data

(63) Continuation-in-part of application No. 18/797,836, filed on Aug. 8, 2024.

(30) Foreign Application Priority Data

Oct. 29, 2024 (CN) ......................... 202422624367.2

(51) Int. Cl.
*B26B 27/00* (2006.01)
*B26B 29/06* (2006.01)
*B26D 1/01* (2006.01)
*B26D 1/04* (2006.01)

(52) U.S. Cl.
CPC .......... *B26D 1/045* (2013.01); *B26D 2210/11* (2013.01)

(58) Field of Classification Search
CPC ........... B26B 27/00; B26B 3/08; B26B 29/06; B26D 2001/006; B26D 1/045; B26D 2210/11; B65H 2701/5112; B65H 35/002; B65H 2301/51532; B65H 2701/1944; B65H 2301/515123; B65H 2301/515; B65H 2301/51512; B65H 2301/515126
USPC ..... 30/278, 2, 280, 297, 289, 298.4; 83/483, 83/651, 614, 635, 649; D8/14, 48, 98; D18/34.3, 34.8
See application file for complete search history.

(56) References Cited

U.S. PATENT DOCUMENTS 2,535,555 A * 12/1950 Tilly ...................... B43M 7/002 30/289
3,513,744 A * 5/1970 Hershberger .......... B26D 1/045 83/520
4,868,989 A * 9/1989 Renaud ..................... B44C 7/08 30/294
5,975,456 A * 11/1999 Bodkin .................. B65H 35/04 83/649
6,524,022 B2 2/2003 Minowa et al.
6,782,784 B2 8/2004 Sato et al.
6,832,537 B2 12/2004 Takabatake et al.
7,624,678 B2 12/2009 Deng
D968,190 S * 11/2022 Tang ................................ D8/98
11,717,977 B1 8/2023 Xie
2006/0156885 A1 7/2006 Wu
2021/0316470 A1 10/2021 Fan
2023/0042565 A1 2/2023 Perla

FOREIGN PATENT DOCUMENTS

CN 110744592 A * 2/2020 ............... B26B 3/08

* cited by examiner

*Primary Examiner* — Ghassem Alie

(57) ABSTRACT

A double-blade paper cutter includes a housing, which includes a first side wall and a second side wall. The first side wall is arranged with a left paper cutting component, which includes a first slit and a first cutting knife. The second side wall is arranged with a right paper cutting component, which includes a second slit and a second cutting knife. The first slit and the second slit both extend axially from the paper feeding end of the housing. The cutting knife is configured to cut a sheet of paper entering the slit from one end of the housing.

13 Claims, 16 Drawing Sheets

PAPER CUTTER AND DOUBLE BLADE PAPER CUTTER

CROSS REFERENCE TO RELATED APPLICATIONS

This application is a continuation-in-part of U.S. patent application Ser. No. 18/797,836, and claims priority benefits to Chinese Patent Application No. 2024226243672, filed on Oct. 29, 2024, the contents of which are incorporated herein by reference.

TECHNICAL FIELD

The present disclosure relates to the technical field of cutting device for cutting rolled paper, and in particular, to a paper cutter and a double blade paper cutter.

BACKGROUND

A paper cutter is a specialized mechanical device used for trimming paper and other similar materials, such as films, labels, cardstock, etc. It is widely used in printing, office settings, packaging, graphic production, education, and arts and crafts.

SUMMARY

A first aspect of the embodiments of the present disclosure provides a double-blade paper cutter, including: a housing, including a first side wall and a second side wall; a left paper cutting component, arranged on the first side wall and comprising a first slit and a first cutting knife; and a right paper cutting component, arranged on the second side wall and comprising a second slit and a second cutting knife. The first slit and the second slits extend axially from a paper feed end of the housing; a blade of the first cutting knife faces an opening end of the first slit, and the first cutting knife is configured to cut a sheet of paper entering from the opening end of the first slit. A blade of the second cutting knife faces an opening end of the second slit, and the second cutting knife is configured to cut a sheet of paper entering from the opening end of the second slit.

A second aspect of the embodiments of the present disclosure provides a paper cutter, including: a housing, a slit, and a cutting knife. The housing includes a first side wall and a second side wall. A receiving chamber for receiving a paper roll is formed between the first side wall and the second side wall; the first side wall and its bottom edge forms a paper separation structure, and the second side wall and its bottom edge forms another paper separation structure. The slit is defined by the first side wall or the second side wall and extends axially from a paper feed end of the housing. A blade of the cutting knife is arranged within the slit and faces an opening end of the slit, and the cutting knife is configured to cut a sheet of paper entering from the opening end of the slit.

BRIEF DESCRIPTION OF THE DRAWINGS

The description and drawings that constitute a part of the present disclosure are provided for a further understanding of the present disclosure. The illustrative embodiments and their descriptions are provided for explanation but do not constitute improper limitations on the present disclosure.

DETAILED WAY

Figure 1:
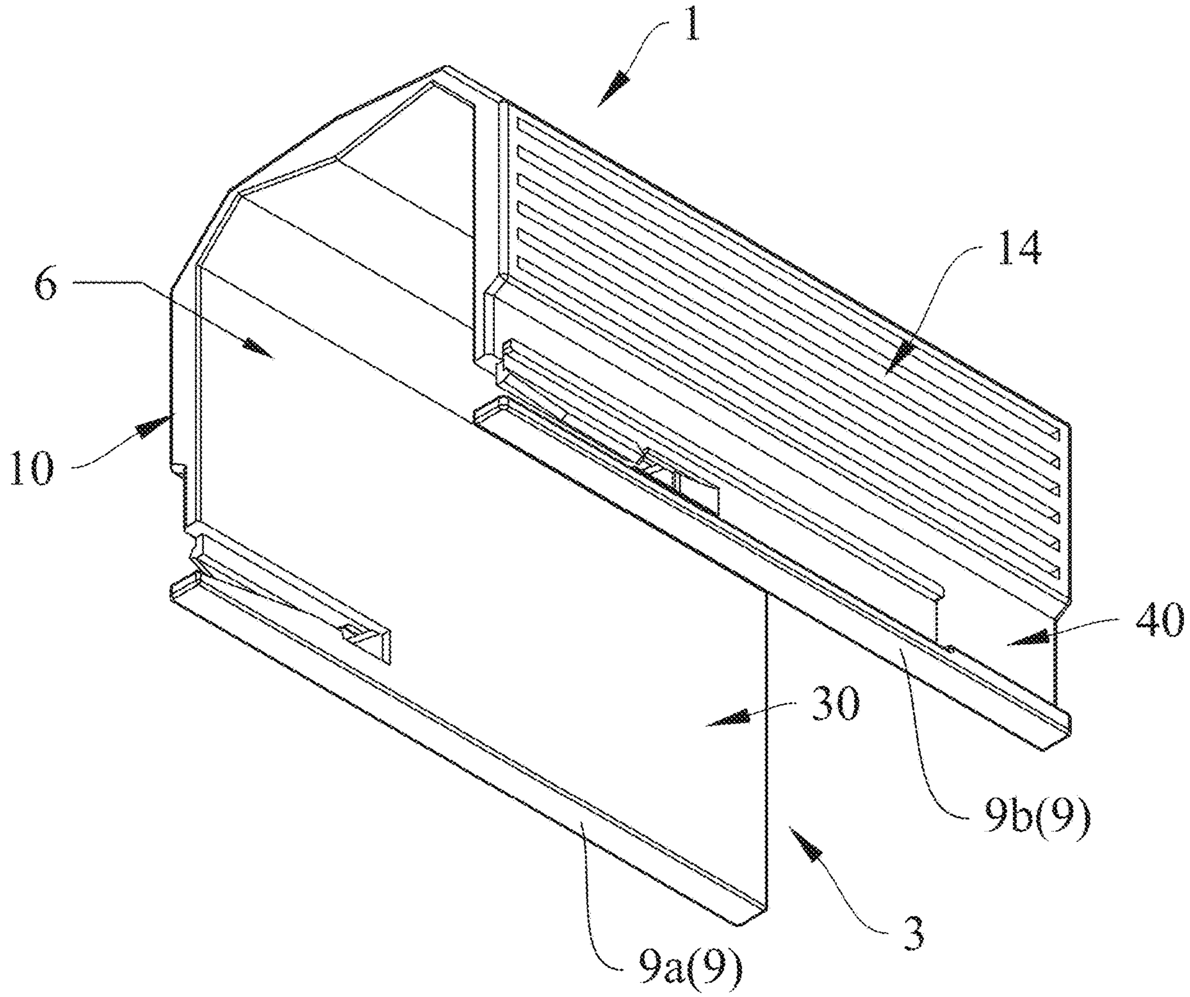
FIG. 1 is a perspective view illustrating a first double-blade paper cutter in accordance with the embodiments of the present disclosure.
Figure 2:
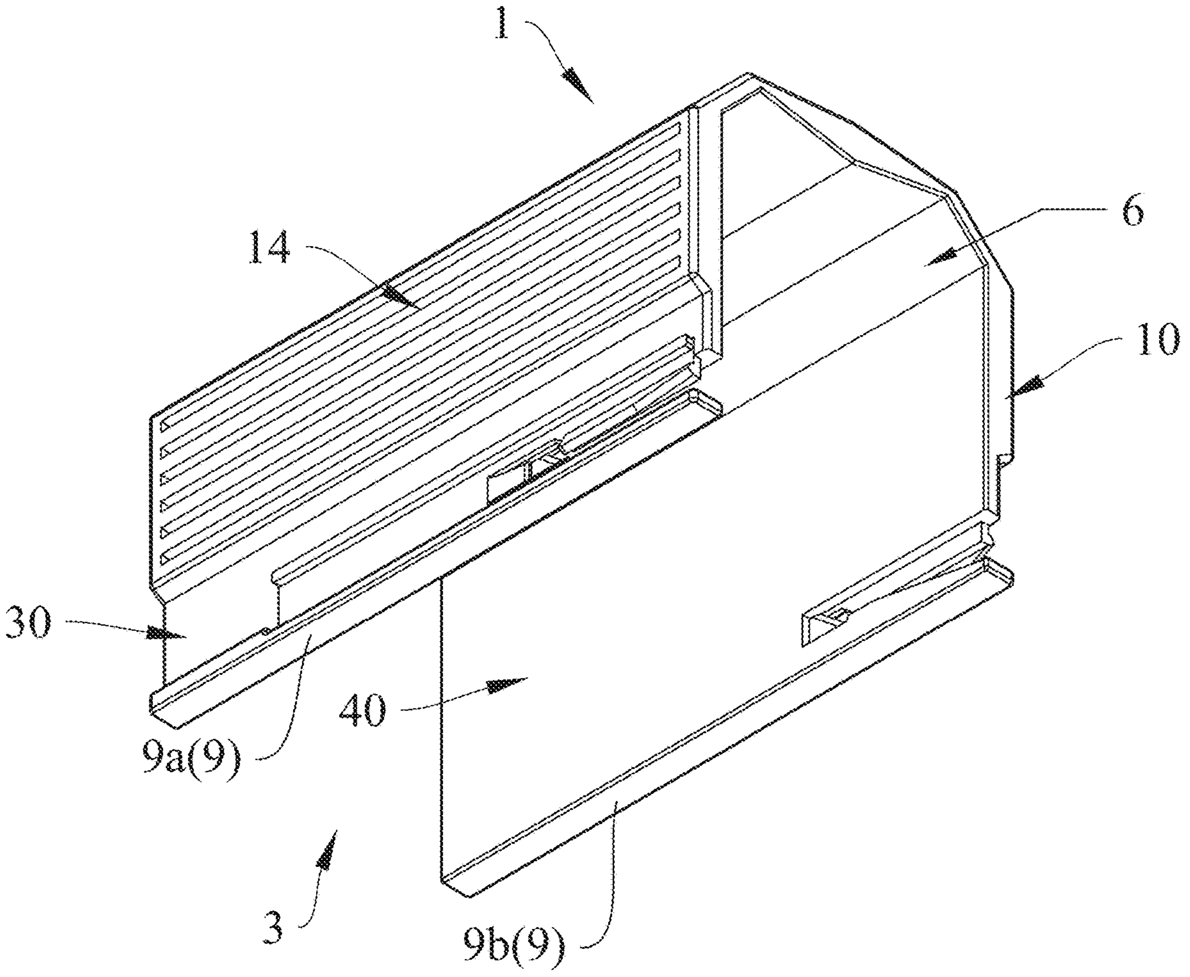
FIG. 2 is another perspective view illustrating a first double-blade paper cutter in accordance with the embodiments of the present disclosure.
Figure 3:
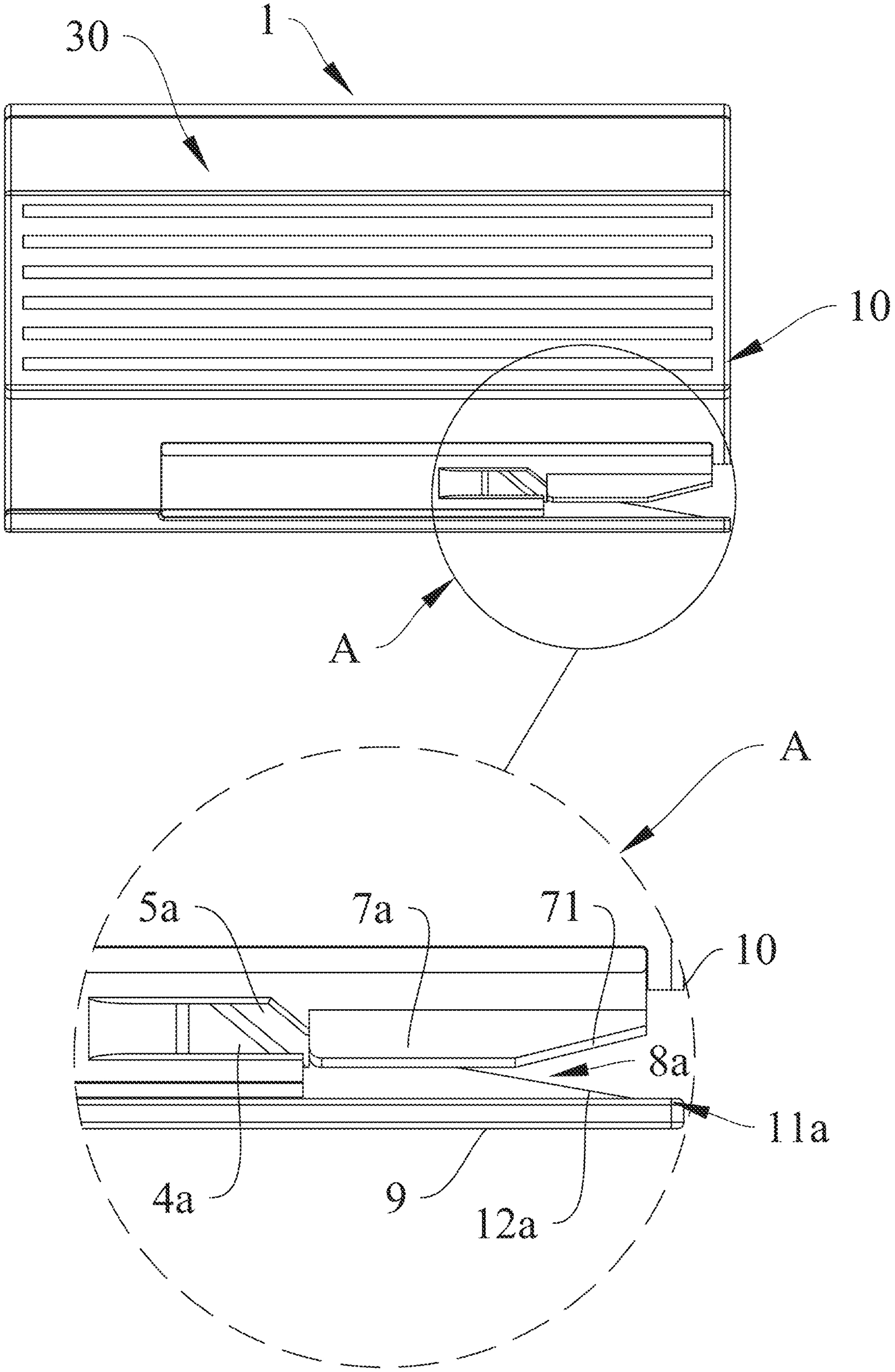
FIG. 3 is a side view of a first double-blade paper cutter in accordance with the embodiments of the present disclosure, which illustrates a partial enlarged view of area A.
Figure 4:
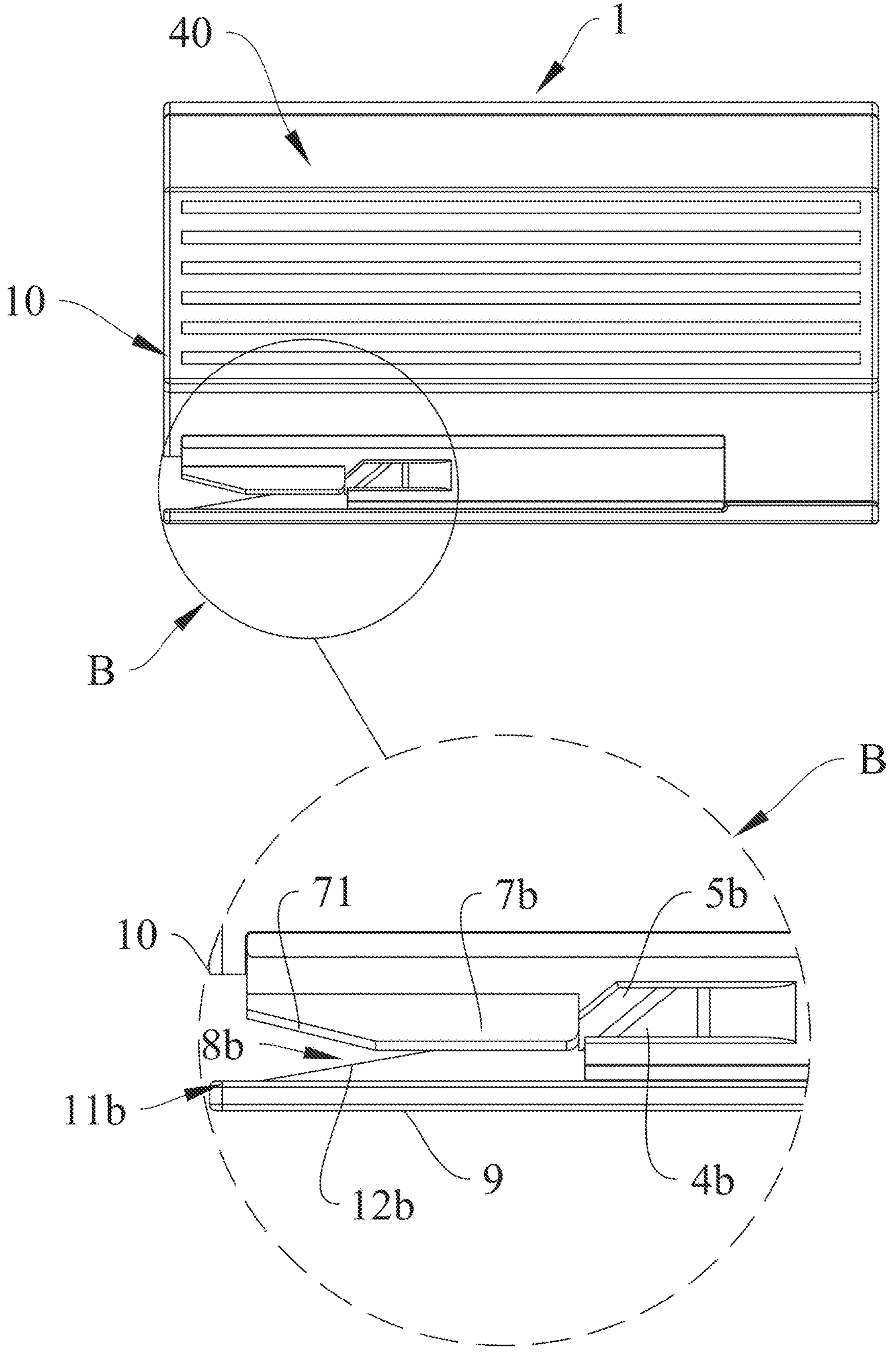
FIG. 4 is another side view illustrating a first double-blade paper cutter in accordance with the embodiments of the present disclosure, which illustrates a partial enlarged view of area B.
Figure 5:
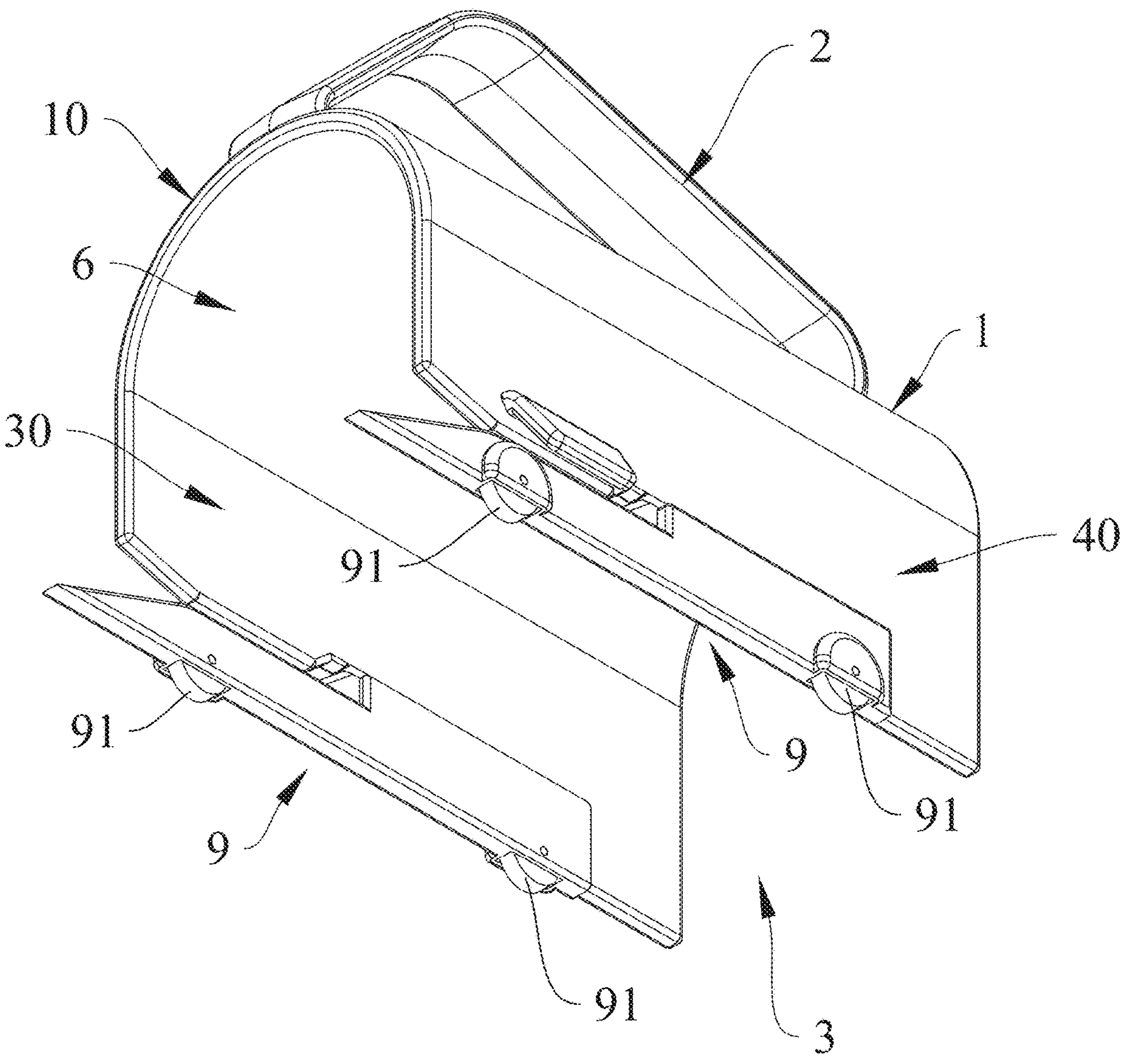
FIG. 5 is a perspective view illustrating a second double-blade paper cutter in accordance with the embodiments of the present disclosure.
Figure 6:
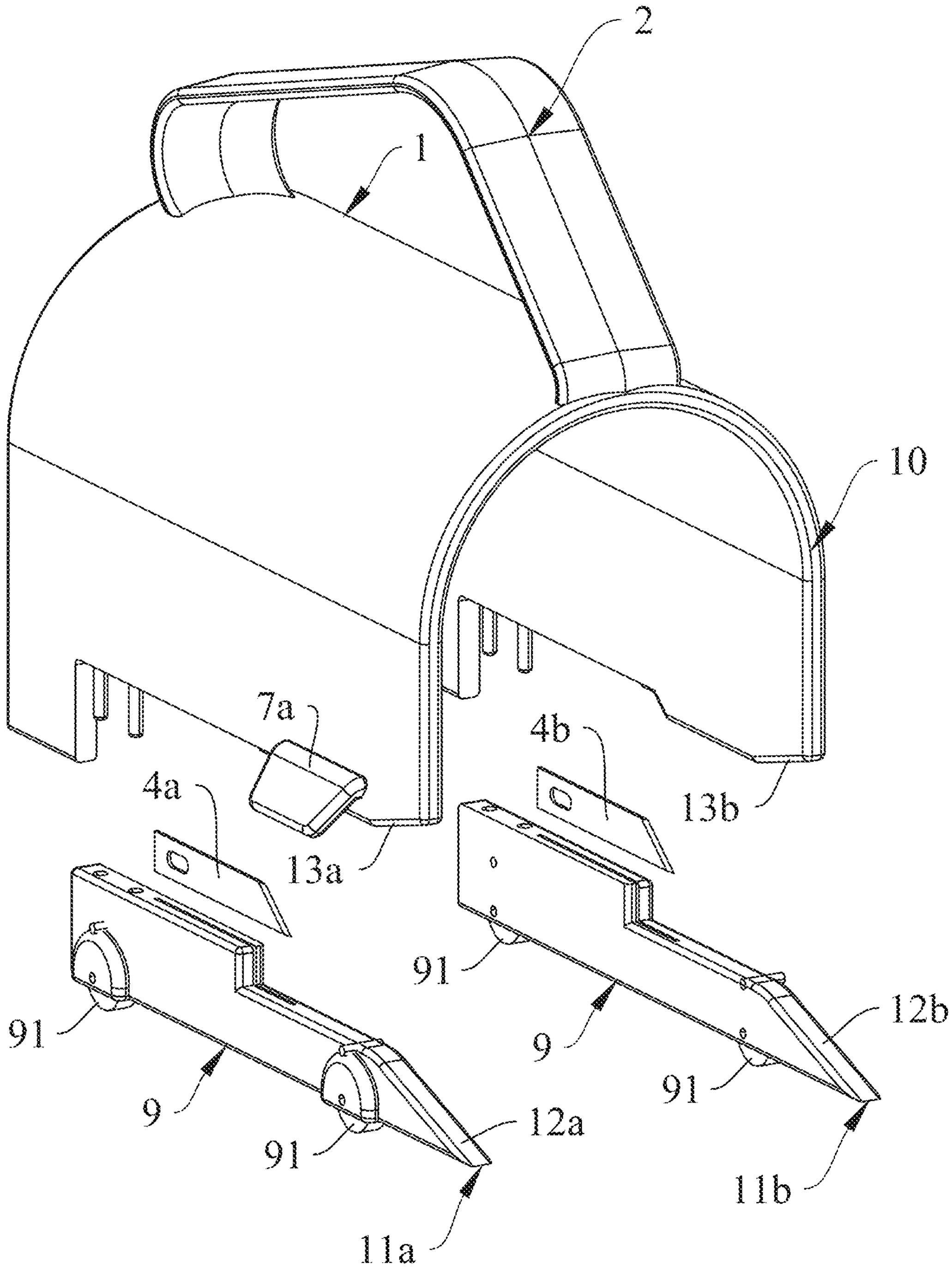
FIG. 6 is an exploded view of a second double-blade paper cutter in accordance with the embodiments of the present disclosure.
Figure 7:
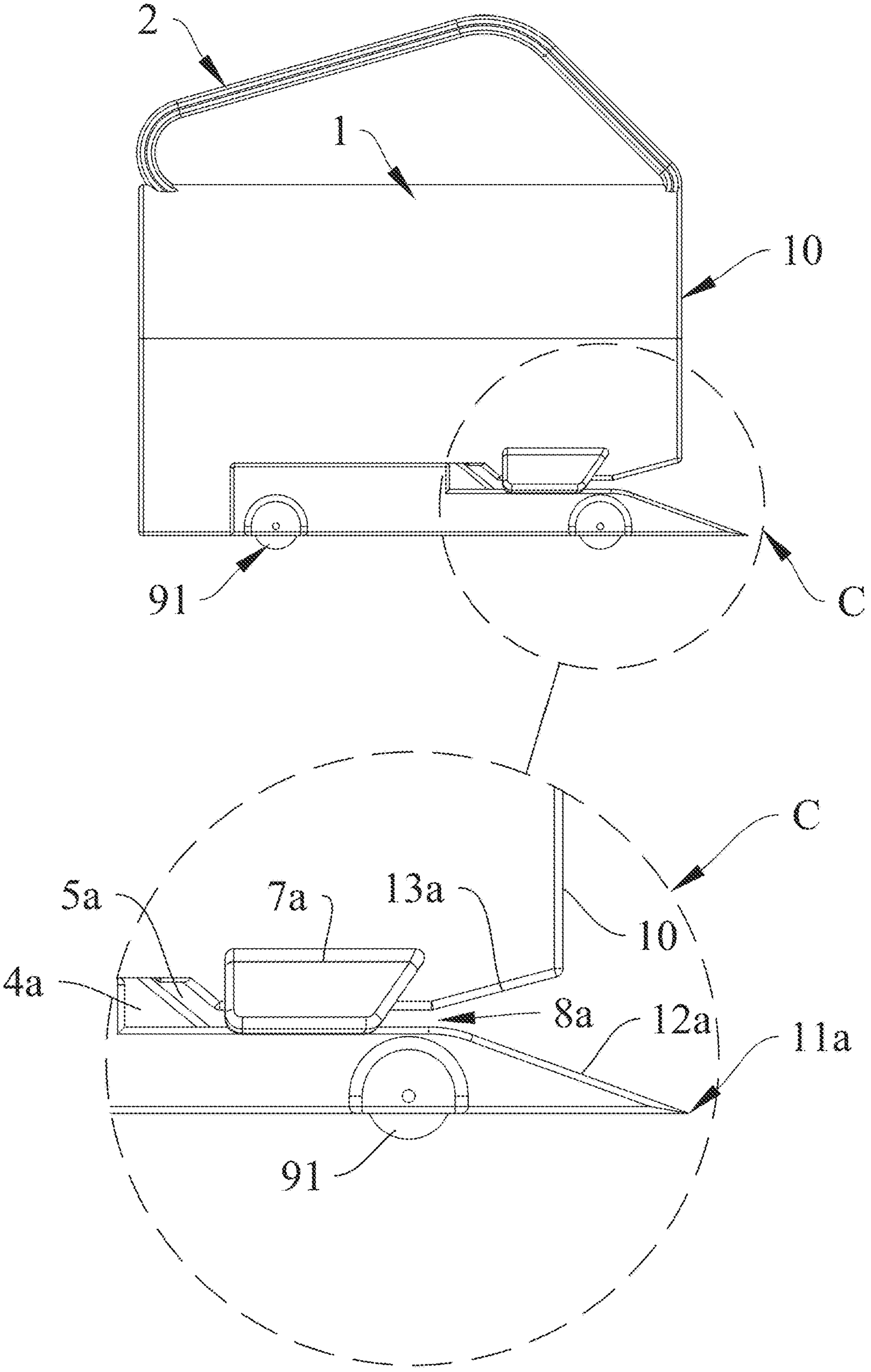
FIG. 7 is a side view of a second double-blade paper cutter in accordance with the embodiments of the present disclosure, which illustrates a partial enlarged view of area C.
Figure 8:
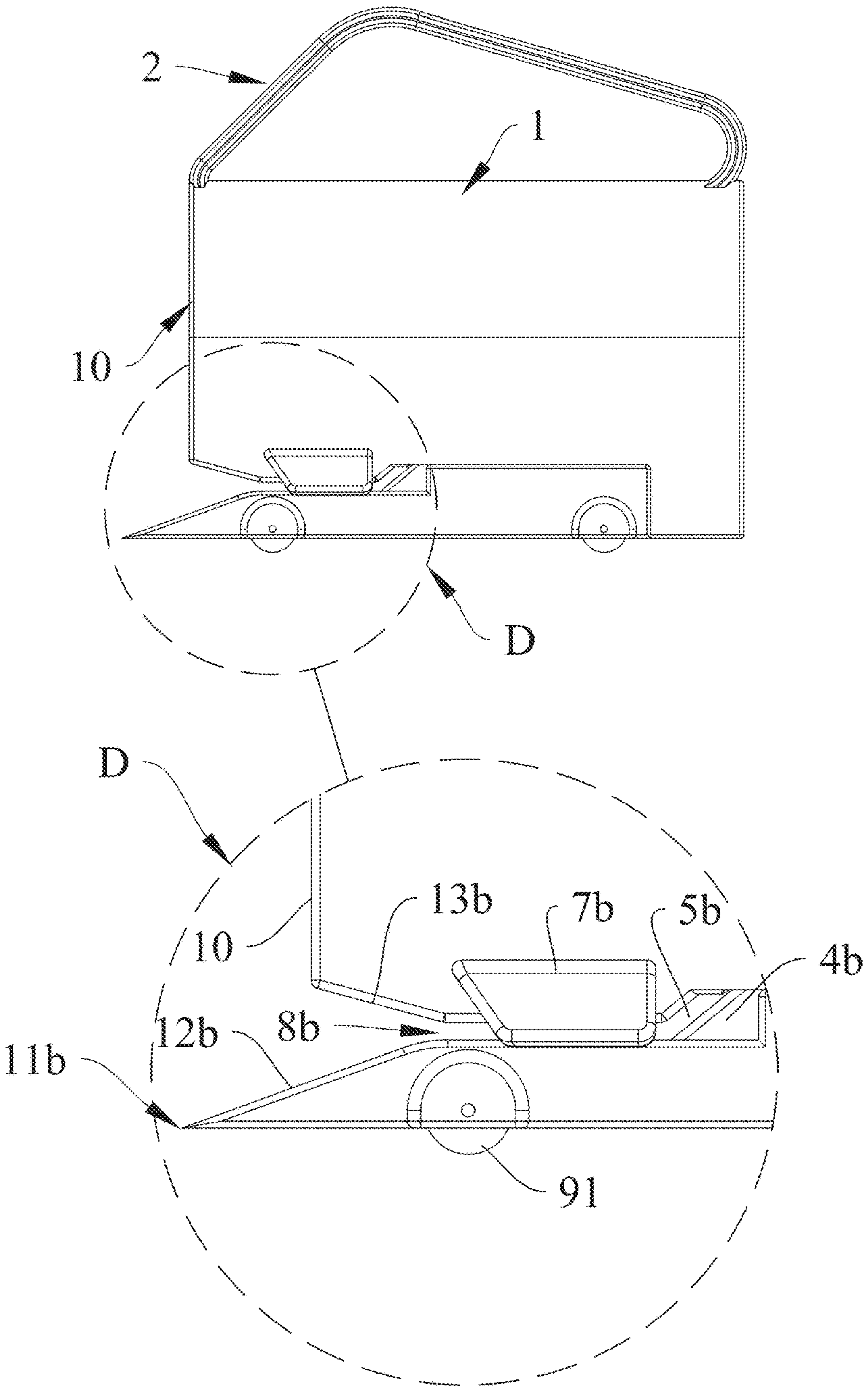
FIG. 8 is a side view of a second double-blade paper cutter in accordance with the embodiments of the present disclosure, which illustrates a partial enlarged view of area D.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of one embodiment may be used according to another embodiment to produce yet another embodiment. Therefore, it is intended that the present disclosure includes such modifications and variations within the scope of the appended claims and their equivalents.

In the description of the present disclosure, the terms “longitudinal”, “lateral”, “upper”, “lower”, “front”, “back”, "left", "right", "vertical", "horizontal", "top", "bottom" and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms "connected", "connecting" and "arranged" used in the present disclosure should be understood in a broad sense. For example, it may be a fixed connection or a detachable connection; it may be directly connected or indirectly connected through an intermediate component; it may also be a wired electrical connection, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

As shown in FIG. 1 to FIG. 13, in accordance with the embodiments of the present disclosure, a double-blade paper cutter is provided. The double-blade paper cutter includes a wall, which defines a hollow interior configured to partially accommodate an elongated paper roll. A housing 1 of the paper cutter has two open ends and a middle opening section running through the two ends, and the middle opening section defines a full length of the paper cutter. In the present disclosure, a longitudinal direction of the middle opening section defines an axial direction of the paper cutter, and a direction perpendicular to a working plane for placing the paper cutter defines a longitudinal direction of the paper cutter. The axially extending middle opening section of the housing 1 may cover at least a portion of the paper roll. The housing 1 includes a first side wall 30 and a second side wall 40 extending longitudinally, and a receiving chamber 6 for accommodating the paper roll is formed between the first side wall 30 and the second side wall 40. The receiving chamber 6 for placing the paper roll is the internal space of the housing 1, improving the space utilization rate and making the paper cutter more compact and portable.

The receiving chamber 6 has an opening 3 defined along the axial direction of the housing 1. The opening 3 facilitates the installation and replacement of the paper roll and improves the user's convenience. A width of the opening 3 is greater than a diameter of the paper roll, allowing the paper roll to rotate circumferentially in the receiving chamber 6. The first side wall 30 and its bottom edge 9*a*, the second side wall 40 and its bottom edge 9*b*, form a paper-separating structure on each side respectively. The paper-separating structure on each side is respectively suitable for left-handed and right-handed people and may effectively separate a sheet of paper from the paper roll. When using the paper-separating structure, the sheet of paper is pulled out from the opening 3, flattened and unfolded along the bottom surface 9*a* of the first side wall 30 or the bottom surface 9*b* of the second side wall 40, and a desired length of the sheet of paper is measured, and then the preferred paper cutting component is used. After ensuring that the sheet of paper to be cut each time is neat and consistent, a corresponding left or right paper cutting component is directly proceeded.

The width of the opening 3 is greater than the diameter of the paper roll, allowing the paper roll to rotate circumferentially in the receiving chamber 6. The opening 3 may ensure a smooth unfolding and cutting of the sheet of paper, thereby improving cutting continuity and efficiency. The first side wall 30 and the second side wall 40 provide stable structural support end and ensure that the paper roll may be smoothly placed and unwound during use. This design enhances cutting stability and precision and guarantees the durability and reliability of the paper cutter.

In some embodiments, as shown in FIG. 1 to FIG. 8, the first side wall 30 is provided with a left paper cutting component, and the second side wall 40 is provided with a right paper cutting component, and the left paper cutting component and the right paper cutting component are arranged axially symmetrically. The left paper cutting component includes a first slit 8*a* extending axially from a paper feed end 10 of the housing 1 and a first cutting knife 4*a* arranged in the housing 1. A blade of the first cutting knife 4*a* faces an opening end of the first slit 8*a*, and an angle and position of the blade for engaging with the sheet of paper may be adjusted to improve cutting quality. The first cutting knife 4*a* is configured to cut paper entering from the opening end of the first slit 8*a*. The right paper cutting component includes a second slit 8*b* extending axially from the paper feed end 10 of the housing 1 and a second cutting knife 4*b* disposed in the housing 1. A blade of the second cutting knife 4*b* faces an opening end of the second slit 8*b*, and an angle and position of the blade for engaging with the sheet of paper may be adjusted to improve cutting quality. The second cutting knife 4*b* is configured to cut the sheet of paper entering from the opening end of the second slit 8*b*. During use, some people are accustomed to using their left hand, while others prefer their right hand. The left and right paper cutting components in the present embodiment may accommodate different hand preferences.

Figure 9:
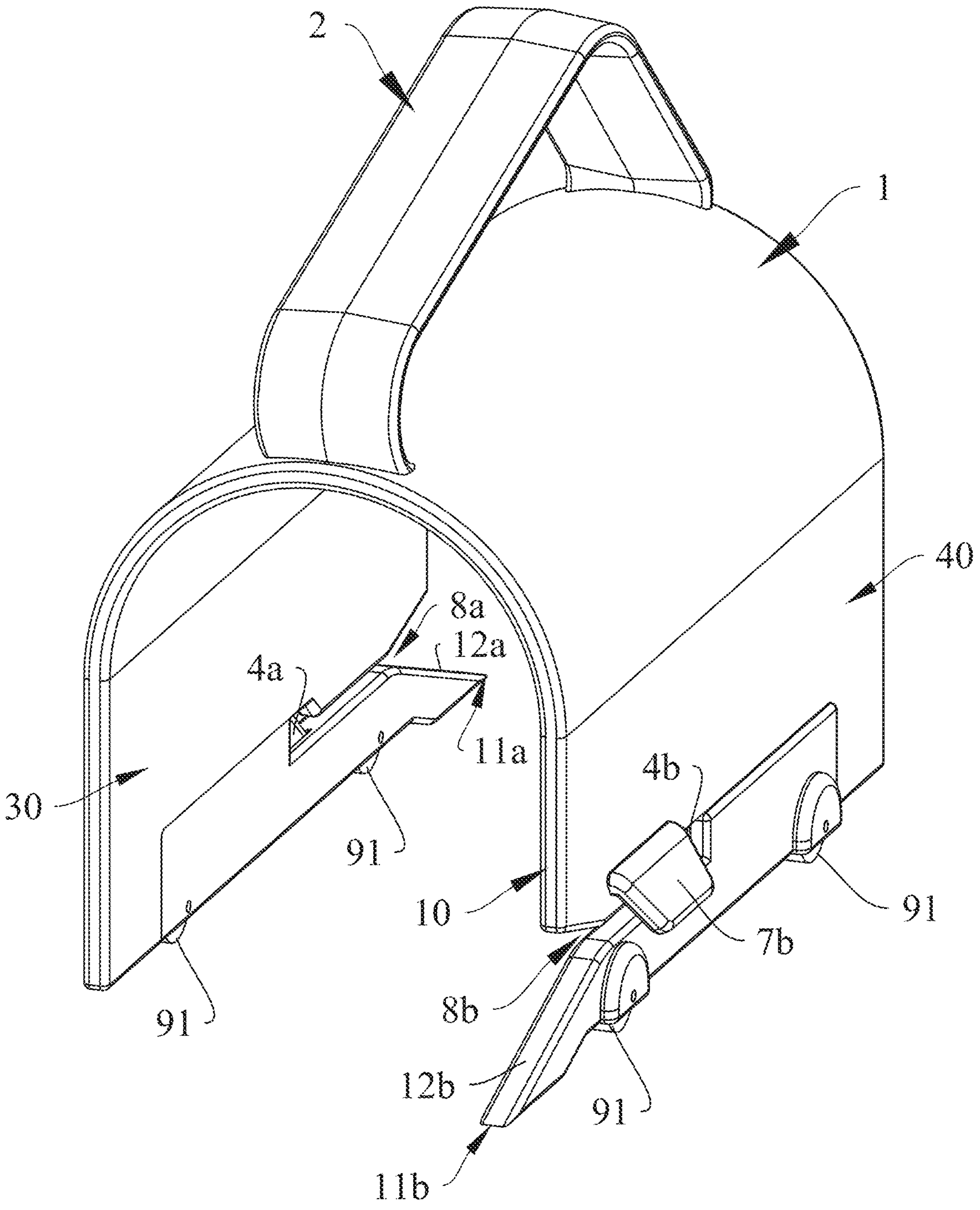
FIG. 9 is a perspective view of a third paper cutter in accordance with the embodiments of the present disclosure.
Figure 10:
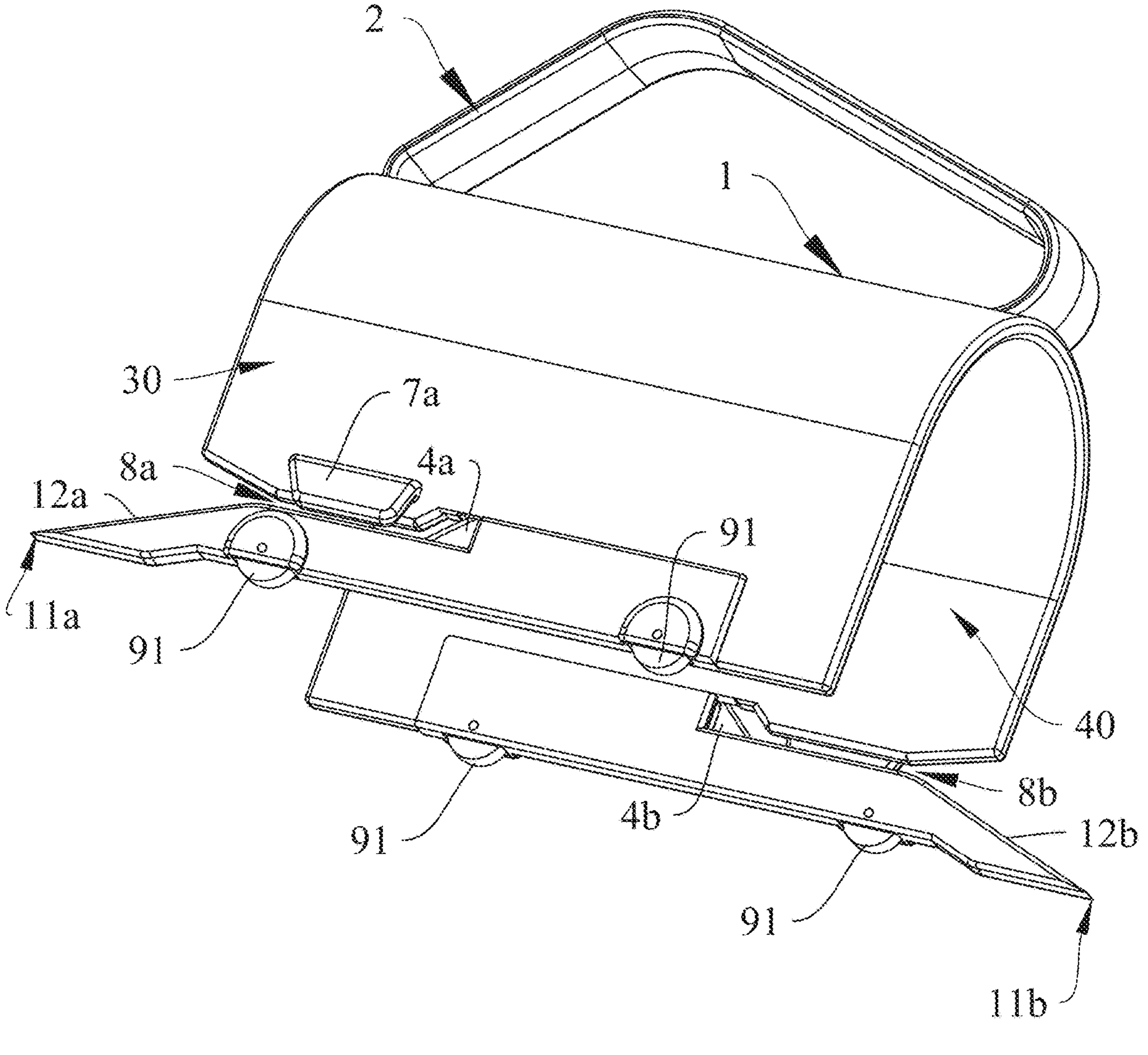
FIG. 10 is another perspective view of a third paper cutter in accordance with the embodiments of the present disclosure.
Figure 11:
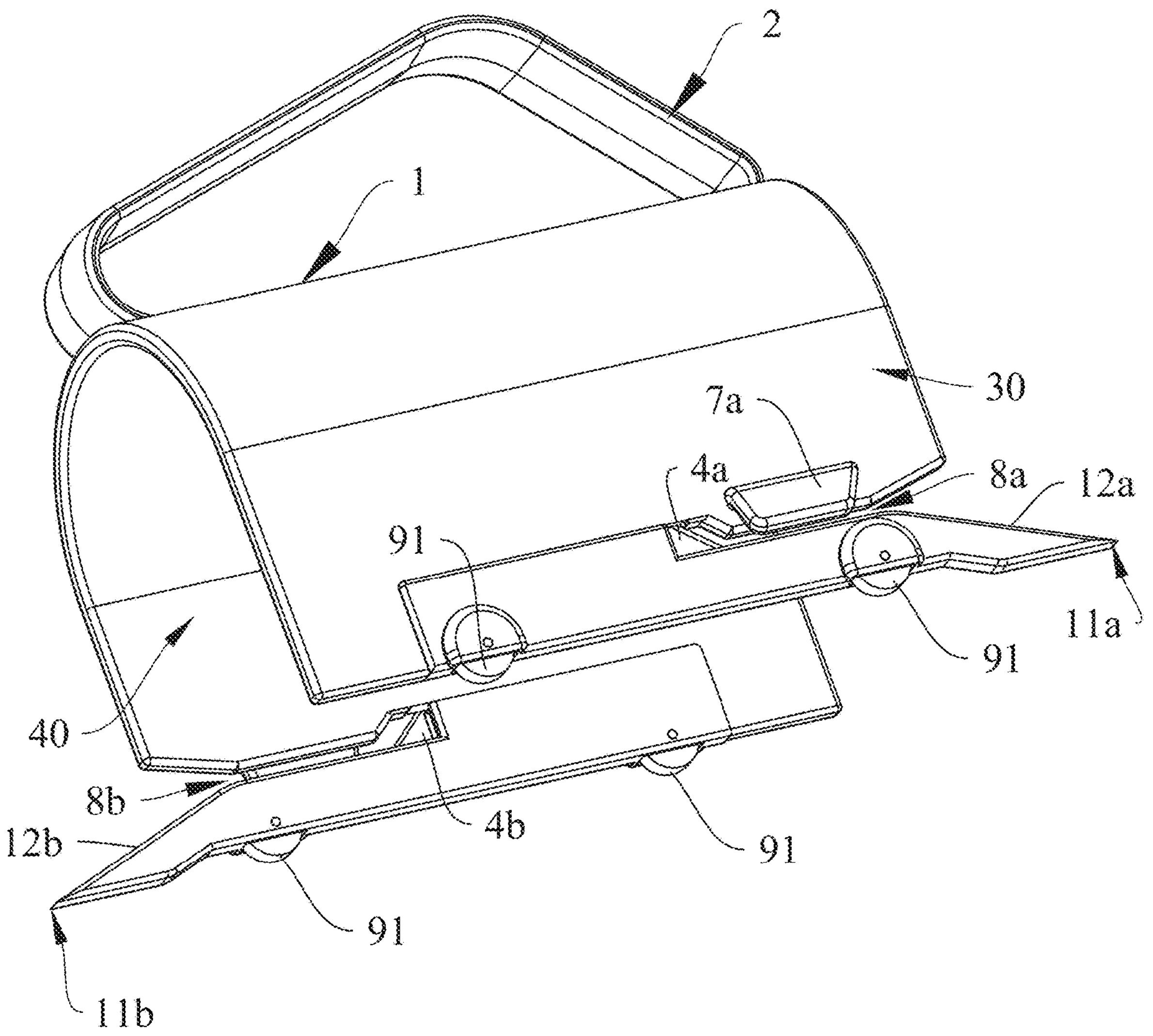
FIG. 11 is a perspective view illustrating a fourth paper cutter in accordance with the embodiments of the present disclosure.

In addition, to facilitate different hand habits, in some embodiments, as shown in FIG. 9 to FIG. 11, the first side wall 30 is provided with a left paper cutting component and the second side wall 40 is provided with a right paper cutting component, which are are arranged in central symmetry. The left paper cutting component and the right paper cutting component of the paper cutter as shown in FIG. 9 to FIG. 10, are both suitable for right-handed people. The left paper cutting component and the right paper cutting component of the paper cutter arranged in central symmetry as shown in FIG. 11, are both suitable for left-handed people.

Figure 12:
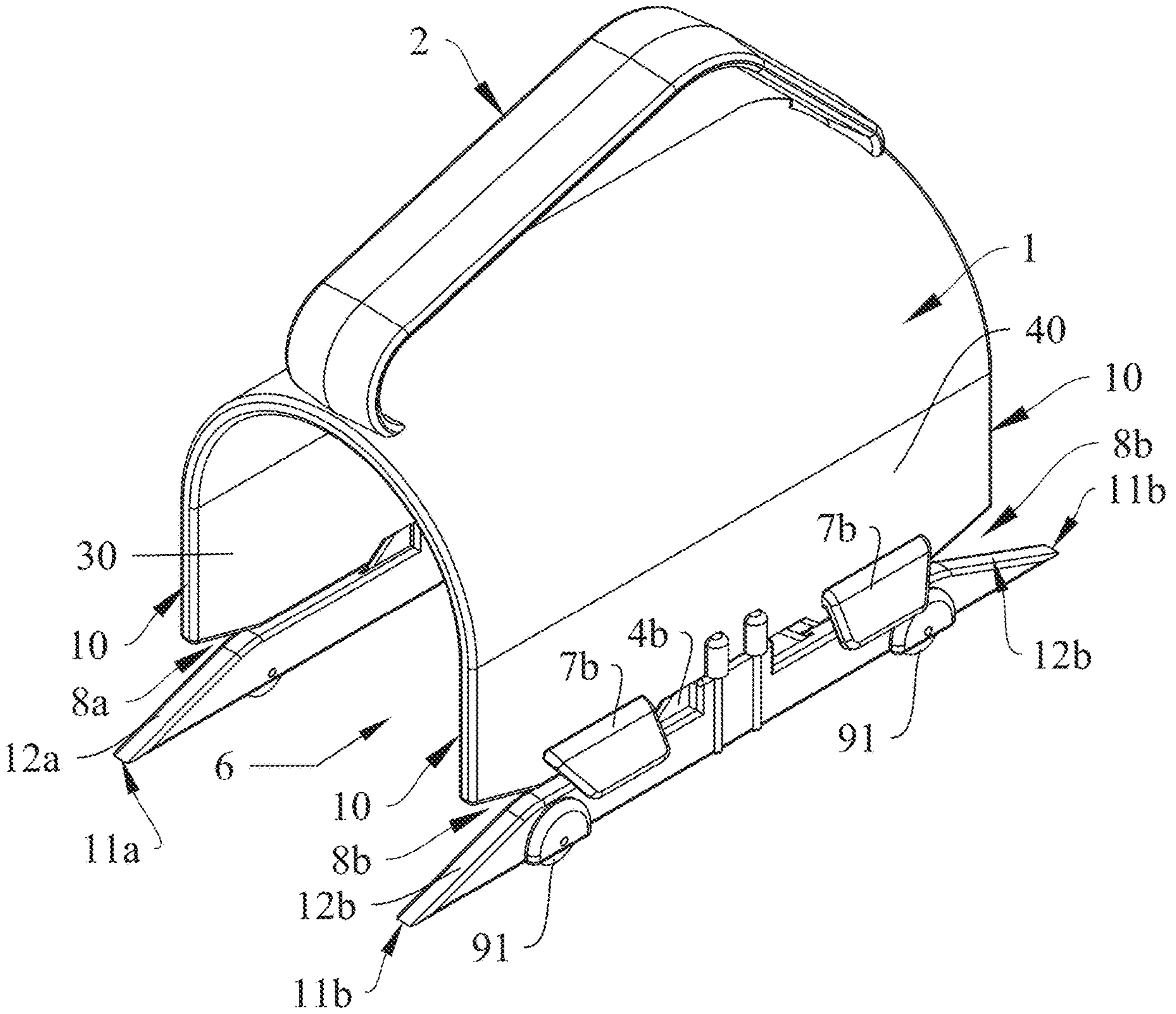
FIG. 12 is a perspective view illustrating a fifth paper cutter in accordance with the embodiments of the present disclosure.
Figure 13:
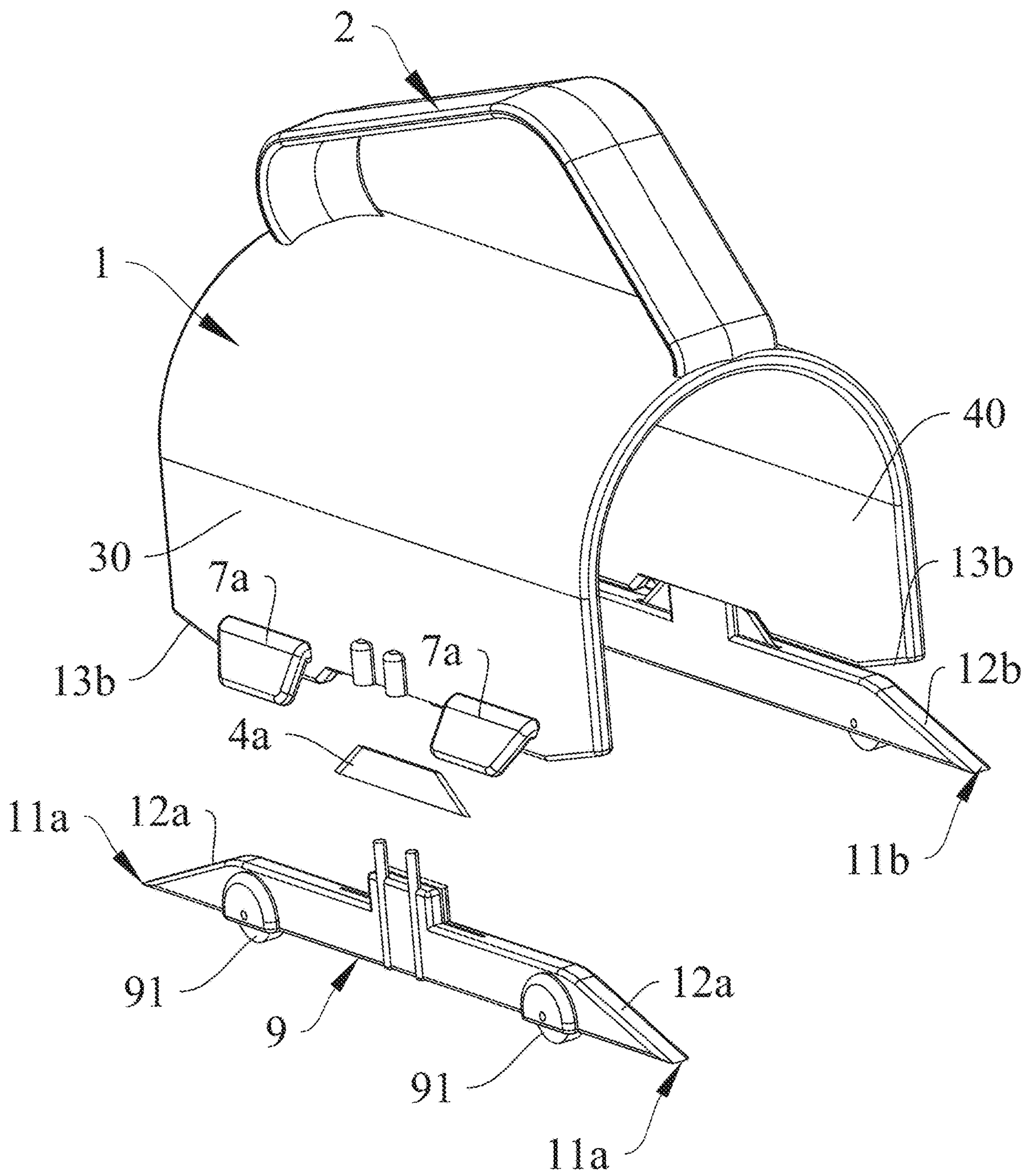
FIG. 13 is an exploded view of a fifth paper cutter and the cutter system in accordance with the embodiments of the present disclosure.

In some embodiments, as shown in FIG. 12 and FIG. 13, the first side wall 30 is provided with two left paper cutting components, which are suitable for both left-handed and right-handed people.

In some embodiments, as shown in FIG. 12 and FIG. 13, the second side wall 40 is provided with two right paper cutting components, which are suitable for both left-handed and right-handed people.

The first slit 8*a* and the second slit 8*b* provided in the above technical solution may guide the sheet of paper into the cutting area along an intended path to ensure cutting precision and consistency. The axially extending first slit 8*a* and second slit 8*b* ensure that the sheet of paper will not deviate, improve cutting efficiency, and reduce paper waste. The cutting knives 4*a* and 4*b* are fixedly installed in the housing 1 to ensure safety and avoid accidental injuries during use.

In some embodiments, as shown in FIG. 1 to FIG. 4, the first cutting knife 4*a* and the second cutting knife 4*b* of the paper cutting component are preset in the housing 1, i.e., the housing 1 and the paper cutting components are an integrated together.

In some embodiments, as shown in FIG. 5 to FIG. 13, the paper cutting component is detachable connected to the housing 1, i.e., a portion of paper cutting component may be detached from the housing 1. The first cutting knife 4*a* and the second cutting knife 4*b* may be pre-installed in the preset grooves of the portion of the paper cutting component, and then that portion of the paper cutting component is installed on the housing 1.

In some embodiments, as shown in FIG. 1 to FIG. 13, the double-blade paper cutter also includes paper pressing plates 7*a* and 7*b*. The first paper pressing plate 7*a* is arranged on an outer wall of the first side wall 30 and at least partially covers the first slit 8*a*; the second paper pressing plate 7*b* is arranged on an outer wall of the second side wall 40 and at least partially covers the second slit 8*b*.

The paper pressing plates 7*a* and 7*b* extend downward and at least partially cover the slits 8*a* and 8*b*, forming a gap between the paper pressing plate 7*a* and the first slit 8*a* and another gap between the paper pressing plate 7*b* and the second slit 8*b*, helping to control the paper introduction path and reduce the deviation of the sheet of paper during the cutting process. The paper pressing plates 7*a* and 7*b* may bend the sheet of paper introduced into the slits into an arc-shaped surface, allowing it to reach a greater stiffness and tension before engaging with the blade of the cutting knife.

The paper pressing plates 7*a* and 7*b* may keep the sheet of paper moving outward and press it down to enter the slits 8*a* and 8*b*, ensuring a smooth cutting edge, reducing jagged, ripped or crooked edges of the sheet of paper, and improving cutting precision and quality. The paper pressing plates 7*a* and 7*b* may prevent the sheet of paper from curling or wrinkling when entering the slits 8*a* and 8*b*, making the slice free of jaggedness, ripped sections, or crooked cuts. During operation, the paper pressing plates 7*a* and 7*b* may more easily control the entry of the sheet of paper, improving operation convenience and efficiency. The paper pressing plates 7*a* and 7*b* may prevent fingers or other foreign objects from entering the slits, improving safety of use.

In some embodiments, as shown in FIG. 1 to FIG. 13, a lower portion of the first side wall 30 is defined with a first declined guide edge 12*a* extending outward and downward from the first slit 8*a*. A lower portion of the second side wall 40 is defined with a second declined guide edge 12*b* arranged on the lower portion of the housing 1 extending outward and downward from the second slit 8*b*.

The declined guide edges 12*a* and 12*b* may guide the sheet of paper to enter the slits 8*a* and 8*b* smoothly, ensuring that the sheet of paper will not deviate from the intended path, improving cutting precision, reducing resistance of the sheet of paper, and enhancing operation convenience and efficiency. The declined guide edges 12*a* and 12*b* may prevent the sheet of paper from jamming when entering the slits 8*a* and 8*b*, reducing failure rate. The declined guide edges 12*a* and 12*b* make it easier to align the sheet of paper with the slits 8*a* and 8*b*, improving operation convenience and consistency.

In some embodiments, as shown in FIG. 1 to FIG. 4, the paper pressing plates 7*a* and 7*b* both are defined with a leading edge 71 proximal to the slits 8*a* and 8*b* respectively. The leading edges 71 may cooperate with the declined guide edges 12*a* and 12*b* to guide the sheet of paper into the slits 8*a* and 8*b*.

In some embodiments, as shown in FIG. 1 to FIG. 13, the housing 1 includes a first tip 11*a* and a second tip 11*b*. The first tip 11*a* is arranged on a lower portion of the housing 1 below the first slit 8*a*; the second tip 11*b* is arranged on the lower portion of the housing 1 below the second slit 8*b*.

The tips 11*a* and 11*b* makes it easier to align the sheet of paper with the slits, reducing the hassle of manually separating the sheet of paper. This improves convenience and efficiency, ensuring that the sheet of paper enters the cutting area smoothly and reducing the failure rate.

In some embodiments, as shown in FIG. 5 to FIG. 13, the first tip 11*a* and the second tip 11*b* are exposed outward relative to the paper feed end 10 of the housing 1. These tips 11*a* and 11*b* makes it easier to lift the sheet of paper, especially when the sheet of paper is thin or stuck together, by easily inserting underneath and separating it. The outward extension of the tips enhances visibility, allowing a user to clearly see the entry position and status of the sheet of paper. This helps the user to promptly detect and correct any misalignment, further improving precision and quality.

In some embodiments, as shown in FIG. 1 to FIG. 4, a bottom edge 9*a* of the first side wall 30 and a bottom edge 9*b* of the second side wall 40 form a support structure 9, with lowest portions of this support structure 9 set on a same plane. This ensures the stability of the paper cutter when placed, preventing it from tilting or wobbling during use, and ensuring even pressure on both sides of the sheet of paper when sliding the paper cutter. Excessive localized pressure on the paper is reduced as the paper cutter moves. The support structure 9 adapts to work surfaces of different heights and flatness, allowing the paper cutter to be placed stably tables, workbenches or other surfaces, enhancing its applicability and flexibility.

In some embodiments, as shown in FIG. 5 to FIG. 13, the double-blade paper cutter also includes a support structure with four end rollers 91 mounted on the housing 1. Lowest portions of the four end rollers 91 are set on a same plane. The end rollers 91 reduce friction between the paper cutter and the work surface, allowing the paper cutter to move easily, while adapting to work surfaces of different heights and flatness, enhancing applicability and flexibility of the device. Additionally, the end rollers 91 minimize noise during movement, improving user experience.

In some embodiments, as shown in FIG. 5 to FIG. 13, the housing 1 also includes a third inclined guide edge 13*a* and a fourth inclined guide edge 13*b*. An upper portion of the first side wall 30 is defined with the third inclined guide edge 13*a*, which is located above the first slit 8*a* and extends outwardly and upwardly relative to the first slit 8*a*. The third inclined guide edge 13*a* and the first declined guide edge 12*a* form an expansion opening for the first slit 8*a*. An upper portion of the second side wall 40 is defined with the fourth inclined guide edge 13*b*, which positioned above the second slit 8*b* and extends outwardly and upwardly relative to the first slit 8*b*. The fourth inclined guide edge 13*b* and the first declined guide edge 12*b* form an expansion opening for the first slit 8*a*.

The third inclined guide edge 13*a* with its corresponding first declined guide edge 12*a* and the fourth inclined guide edge 13*b* with its corresponding second declined guide edge 12*b*, respectively form expansion openings that enlarges the entrances to the first slit 8*a* and the second slit 8*b*. This design makes it easier for paper to enter the slits, reducing the occurrences of paper jamming or misalignment due to narrow entrances. The inclined guide edges 13*a* and 13*b* help guide the sheet of paper into the slits 8*a* and 8*b* smoothly, ensuring that the sheet of paper follows the intended path as it enters. This improves precision and consistency of paper entry, thereby improving cutting precision and quality. The inclined guide edges 13*a* and 13*b* reduce resistance as the sheet of paper enters the slits, making it easier for the sheet of paper to be guided in. This improves operation convenience and efficiency, reducing the difficulty of the user. The expansion openings prevent paper jams as it enters the slits, ensuring smooth entry into the cutting area, reducing failure rates, and thus improving reliability and stability of the device.

In some embodiments, as shown in FIG. 5 to FIG. 13, a grip 2 is connected to the housing 1. When holding the grip 2, one component of the force applied by a user's hand is perpendicular to the work plane for supporting the paper cutter. This ensures that during the cutting process the paper cutter does not deviate laterally from the preset cutting path, enhancing operation stability and precision. This design also reduces the risk of accidental slipping during cutting, minimizing the chance of fingers or other parts contacting the cutting knife and improve safety.

In some embodiments, as shown in FIG. 1 to FIG. 4, the outer wall of the housing 1 of the paper cutter is also provided with a plurality of anti-slip lines 14, which significantly increases the friction of the outer wall of the housing 1. When operating the paper cutter, especially when applying greater cutting force, the anti-slip lines 14 ensure that the user's hand does not slip. This allows for a more secure grip without the need for excessive force, thereby reducing strain on the hand and wrist. It also minimizes the risk of inaccurate cuts or accidental injuries due to hand slippage, enhancing operational stability and safety, and improving grip stability.

Figure 14:
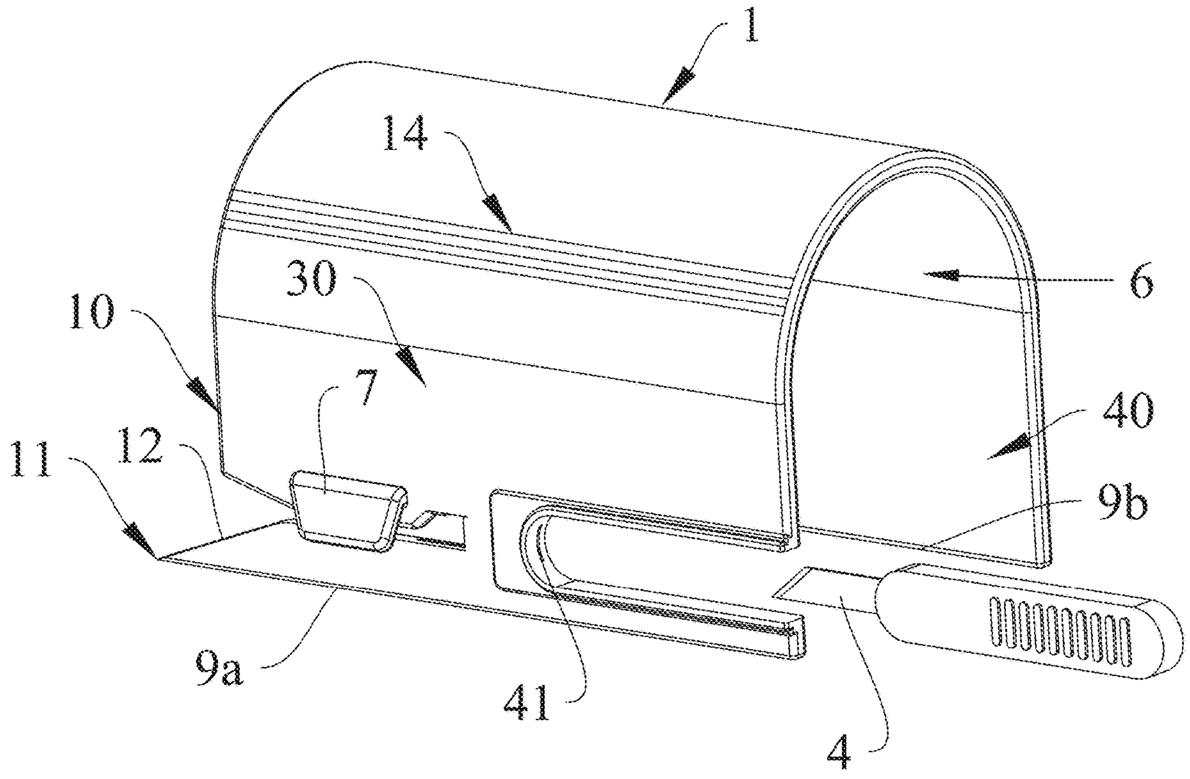
FIG. 14 is an exploded view of a sixth paper cutter with a cutting knife disassembled in accordance with the embodiments of the present disclosure.
Figure 15:
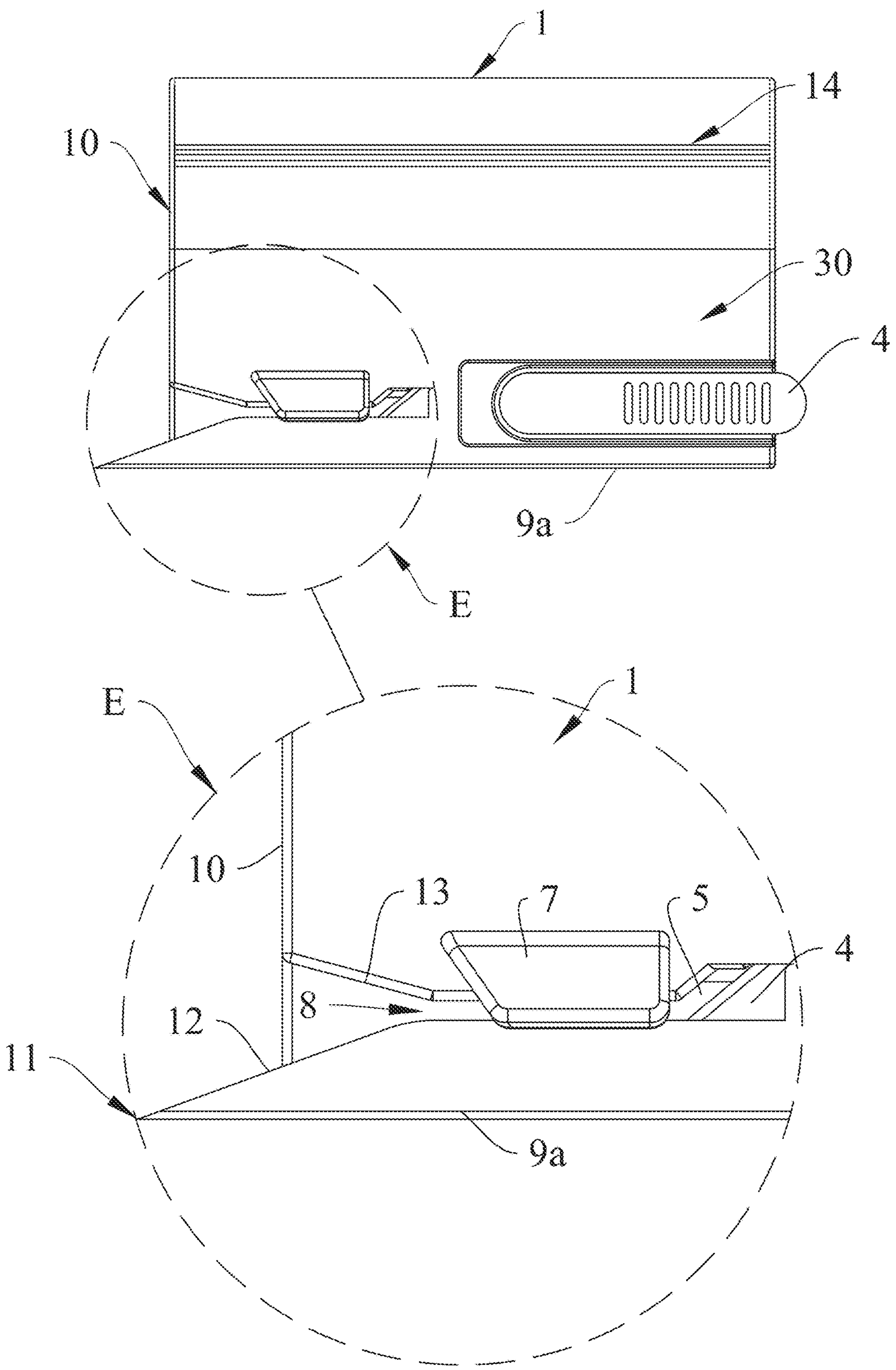
FIG. 15 is a perspective view illustrating a sixth paper cutter in accordance with the embodiments of the present disclosure, which illustrates a partial enlarged view of area E.
Figure 16:
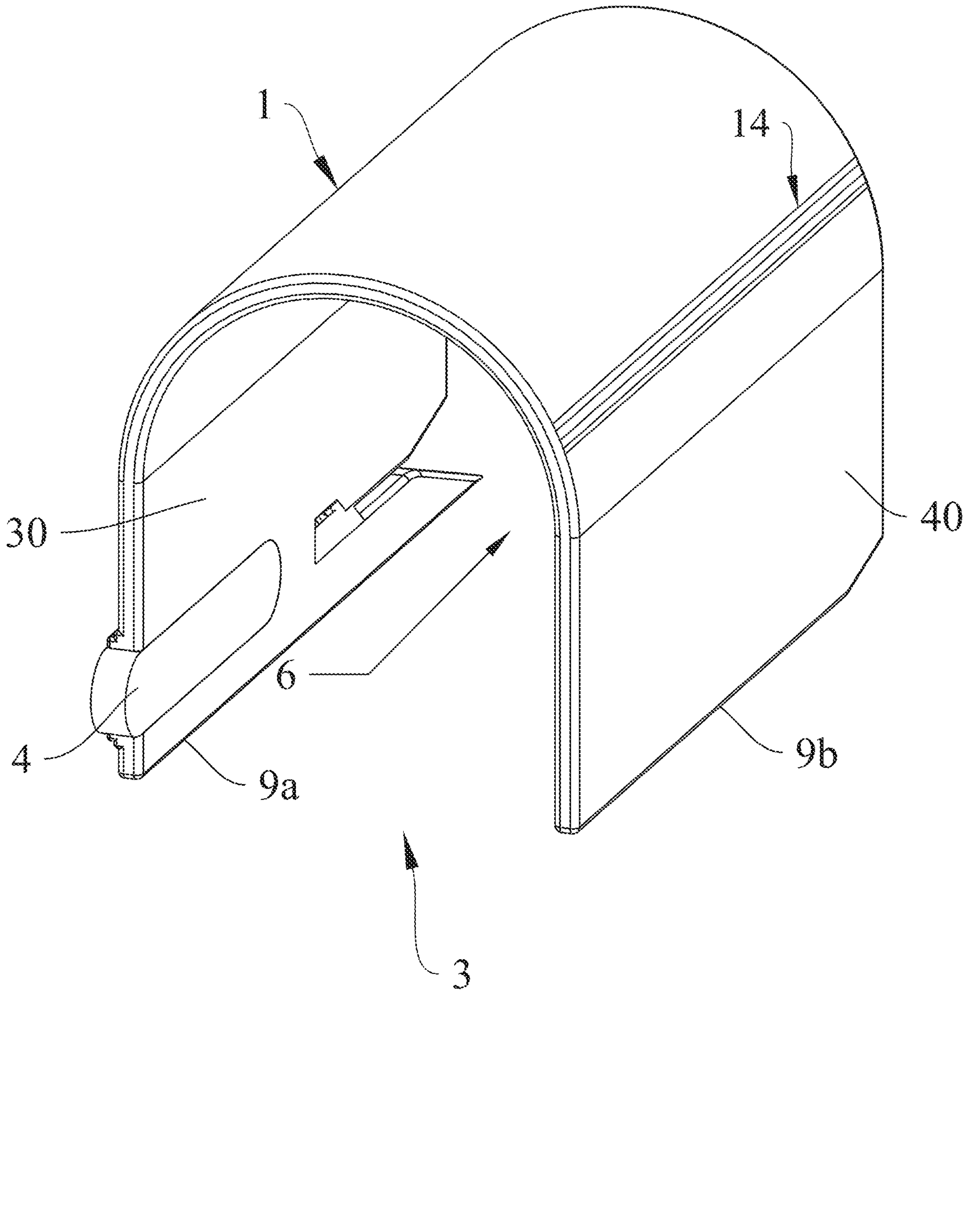
FIG. 16 is another perspective view illustrating a sixth paper cutter in accordance with the embodiments of the present disclosure.

According to an embodiment of the present disclosure, as shown in FIG. 14 to FIG. 16, a paper cutter is provided, including a housing 1. The housing 1 includes a first side wall 30 and a second side wall 40, which defines a receiving chamber 6 for receiving a paper roll. The first side wall 30 and its corresponding bottom edge forms a paper separation structure, and the second side wall 40 and its corresponding bottom edge forms another paper separation structure. During the paper separation operation, the sheet of paper is pulled out from an opening 3, i.e. from a side of the opening 3 proximal to the bottom edge of the first side wall 30 or a side of the opening 3 proximal to the bottom edge of the second side wall 40. Then, it is unfolded and flattened through the bottom surface of the first side wall 30 or the second side wall 40, a desired length of the sheet of paper is measured, and then the sheet of paper is cut. The separation structure may effectively separate the sheet of paper, ensure a neat and consistent cut, and improve cutting efficiency and quality.

The bottom surface of the first side wall 30 or the bottom surface of the second side wall 40 may ensure that the paper roll be placed and unfolded stably, improve cutting stability and precision, and ensure durability and reliability of the paper cutter. The internal space of the housing 1 forms the receiving chamber 6 to hold the paper roll and allows it to rotate circumferentially, thereby improving space utilization rate and making a more compact and portable paper cutter.

In some embodiments, the bottom edge 9*a* of the first side wall 30 and the bottom edge 9*b* of the second side wall 40 of the double-blade paper cutter form a support structure, with its lowest opening portions to be coplanar. The support structure prevents the paper cutter from tilting or shaking and ensure that the sheet of paper on both sides of the paper cutter is evenly stressed when moving the paper cutter. Additionally, the problem of localized excessive pressure on the sheet of paper is reduced, ensuring the stability of the paper cutter.

The slit 8 is defined by the lower opening portion of the first side wall 30 or the second side wall 40 of the housing 1 and extends axially relative to the paper feed end 10 of the housing 1. The blade of the cutting knife 4 is arranged in the slit 8. The cutting knife 4 is configured to cut the sheet of paper entering the slit 8 from the paper feed end 10 of the housing 1. The slit 8 helps guide the sheet of paper into the cutting area along an intended path to make a precise and consistent cut. The slit 8 may prevent the sheet of paper from deviating during the cutting process, thereby improving cutting effect.

The paper pressing plate 7 is connected to the outer wall of the housing 1 and at least partially covers a corresponding slit 8. The paper pressing plate 7 helps to control the paper introduction path and reduce the deviation of the sheet of paper during the cutting process. The paper pressing plate 7 bends the sheet of paper introduced into the slit into an arc surface, allowing the sheet of paper to reach a maximum stiffness and tension before engaging with the blade of the cutting knife.

The lower declined guide edge 12 is arranged on the lower portion of the housing 1 and is located below a corresponding slit 8. The declined guide edge 12 extends outward and downward relatively to the slit 8. The lower declined guide edge 12 guides the sheet of paper into the slit 8 smoothly, ensuring that the sheet of paper to follow the intended path, improves cutting precision, reduces resistance, and improves operation convenience and efficiency.

A tip 11 is arranged at one end of the lower portion of the housing 1 and is located below a corresponding slit 8. The tip 11 may be inserted underneath the sheet of paper. The tip 11 may lift or separate the sheet of paper more easily, especially when the sheet of paper is thin or stuck together. In addition, the sheet of paper may be more conveniently aligned with the slit, reducing the hassle of manually separating the sheet of paper, improving operation convenience and efficiency, thereby ensuring that the sheet of paper enters the cutting area smoothly and reducing the failure rate.

The tip 11 is exposed outward relative to the paper feed end 10 of the housing 1. The design with the tip exposed outward increases visibility of the paper cutter as it enters underneath the sheet of paper, allowing the user to more clearly see the entry position and status of the sheet of paper during use.

An upper portion of the first side wall 30 or the second side wall 40 is defined with the upper inclined guide edge 13, which is located above the slit 8. The upper inclined guide edge 13 extends outward and upward relative to the slit 8. The upper inclined guide edge 13 helps guide a smooth entry of the sheet of paper, ensuring that the sheet of paper does not deviate from the intended path, improving precision and consistency of the sheet of paper entering the slit 8, and enhancing cutting precision and quality.

In some embodiments, the outer wall of the housing 1 is also provided with a plurality of anti-slip lines 14 for increasing the friction of the outer wall of the housing 1. The anti-slip lines 14 may ensure that the user's hand will not slip, thereby increasing the stability of the grip.

In some embodiments, as shown in FIG. 14 to FIG. 16, the cutting knife 4 is detachably disposed in a preset mounting groove 41 defined in the wall of the housing 1. The user may easily remove and replace the cutting knife without sending the paper cutter for repair or purchasing a new paper cutter, saving cost and time. With the detachable structure, the user may regularly replace the worn cutting knife, or remove the cutting knife for cleaning, helping to remove paper scraps and other residues on the cutting knife. This maintains the sharpness and cleanliness of the cutting knife, improves cutting quality and efficiency, and extends the service life of the paper cutter. In addition, this not only reduces overall maintenance cost, but also ensures long-term performance and reliability of the paper cutter. The cutting knife 4 may be a standalone wallpaper knife or other blades suitable for installed in the preset mounting groove 41. The cutting knife 4 is detachable and can be used independently, making it easy to replace and enhancing its functionality. This improves versatility, applicability and flexibility.

In some embodiments, as shown in FIG. 3, FIG. 4, FIG. 7, FIG. 8 and FIG. 15, notches 5*a*, 5*b* are formed on two sides corresponding to the blade of the cutting knife and the slit 8. When the sheet of paper to be cut approaches the cutting knife 4, it slides upward along the blade of the cutting knife 4. The diamond-shaped notches 5*a*, 5*b* may disperse the stress at the cutting point, reduce localized excessive stress, make the edge of the sheet of paper more smooth, and reduce the risk of deformation and ripping of the edge.

The above description is only some embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

The invention claimed is:

1. A double-blade paper cutter, comprising:
- a U-shaped housing, comprising a first side wall and a second side wall;
- a left paper cutting component, arranged on the first side wall and comprising a first slit and a first cutting knife; and
- a right paper cutting component, arranged on the second side wall and comprising a second slit and a second cutting knife;
- wherein the first slit and the second slit extend axially from a paper feed end of the housing;
- a blade of the first cutting knife faces an opening end of the first slit, and the first cutting knife is configured to cut a sheet of paper entering from the opening end of the first slit; and
- a blade of the second cutting knife faces an opening end of the second slit, and the second cutting knife is configured to cut a sheet of paper entering from the opening end of the second slit;
- the double-blade paper cutter further comprises:
- a first paper pressing plate, arranged on an outer surface of the first side wall and at least partially covering the first slit; and
- a second paper pressing plate, arranged on an outer surface of the second side wall and at least partially covering the second slit;
- wherein a portion of the first side wall extends laterally and downward to form the first paper pressing plate and a portion of the second side wall extends laterally and downward to form the second paper pressing plate; an extension direction of each of the first paper pressing plate and the second paper pressing plate is substantially perpendicular to a longitudinal direction of the double-blade paper cutter.

2. The double-blade paper cutter according to claim 1,
- wherein a receiving chamber for receiving a paper roll is formed between the first side wall and the second side wall; the first side wall and a bottom edge thereof form a paper separation structure, and the second side wall and a bottom edge thereof form another paper separation structure.

3. The double-blade paper cutter according to claim 2,
- wherein a lower portion of the first side wall defines a first declined guide edge extending outward and downward relative to the first slit; and
- a lower portion of the second side wall defines a second declined guide edge extending outward and downward relative to the second slit.

4. The double-blade paper cutter according to claim 3,
- wherein the housing further comprises:
- a third inclined guide edge, defined by an upper portion of the first side wall and extending outward and upward relative to the opening end of the first slit; and
- a fourth inclined guide edge, defined by an upper portion of the second side wall and extending outward and upward relative to the opening end of the second slit; and
- wherein the third inclined guide edge and the first declined guide edge form an expansion opening for the first slit; and
- the fourth inclined guide edge and the second declined guide edge form an expansion opening for the second slit.

5. The double-blade paper cutter according to claim 2, wherein the housing further comprises:
- a first tip, arranged on an end of the first side wall and located below the opening end of the first slit; and
- a second tip, arranged on an end of the second side wall and located below the opening end of the second slit.

6. The double-blade paper cutter according to claim 5,
- wherein the first tip and the second tip are both exposed outward relative to the paper feed end of the housing.

7. The double-blade paper cutter according to claim 1, further comprising:
- a support structure, comprising a bottom edge of the first side wall and a bottom edge of the second side wall, wherein lowest portions of the support structure are coplanar.

8. The double-blade paper cutter according to claim 1, further comprising:
- a support structure, comprising a plurality of end rollers mounted on the housing, wherein lowest portions of the plurality of end rollers are coplanar.

9. The double-blade paper cutter according to claim 1, further comprising:
- an opening, arranged along an axial direction of the housing, wherein a width of the opening is greater than a diameter of a paper roll.

10. The double-blade paper cutter according to claim 1, further comprising:
- a grip connected to the housing, wherein when a force is applied to the grip, at least a component of the force is perpendicular to a work surface for supporting the paper cutter.

11. The double-blade paper cutter according to claim 1, further comprising:
- a plurality of anti-slip lines arranged on an outer wall of the housing.

12. The double-blade paper cutter according to claim 1, wherein the first paper pressing plate and the second paper pressing plate are symmetrical with respect to a longitudinal center plane of the double-blade paper cutter.

13. The double-blade paper cutter according to claim 1, wherein the left paper cutting component comprises a rhombic notch facing the blade of the first cutting knife, and the right paper cutting component comprises a rhombic notch facing the blade of the second cutting knife.

* * * * *